(12) United States Patent
Blaine et al.

(10) Patent No.: US 9,158,661 B2
(45) Date of Patent: Oct. 13, 2015

(54) ENHANCED DEBUGGING FOR EMBEDDED DEVICES

(75) Inventors: Russell A. Blaine, San Francisco, CA (US); Matthew Byom, San Jose, CA (US); Kevin Rathbun Walker, San Jose, CA (US); Daniel S. Heller, San Francisco, CA (US); Shantonu Sen, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 255 days.

(21) Appl. No.: 13/620,133

(22) Filed: Sep. 14, 2012

(65) Prior Publication Data

US 2013/0212425 A1    Aug. 15, 2013

(51) Int. Cl.
G06F 11/00 (2006.01)
G06F 11/36 (2006.01)

(52) U.S. Cl.
CPC .................. *G06F 11/3648* (2013.01)

(58) Field of Classification Search
CPC ............. G06F 11/362; G06F 11/3648; G06F 11/3652; G06F 11/3664; G06F 12/10; G11C 16/0425
USPC .................... 714/30, 38.11; 710/110; 703/28; 717/124, 127
See application file for complete search history.

(56) References Cited

U.S. PATENT DOCUMENTS

| | | | |
|---|---|---|---|
| 5,386,522 A * | 1/1995 | Evans ........................... | 717/124 |
| 6,769,077 B2 | 7/2004 | Vachon et al. | |
| 7,213,216 B2 | 5/2007 | Ng et al. | |
| 7,979,745 B2 | 7/2011 | Moroda | |
| 2002/0007430 A1 * | 1/2002 | Kawasaki et al. .............. | 710/110 |
| 2003/0142550 A1 * | 7/2003 | Kawahara et al. ........ | 365/185.28 |
| 2004/0103175 A1 * | 5/2004 | Rothman et al. .............. | 709/222 |
| 2004/0268359 A1 * | 12/2004 | Hanes ........................... | 719/310 |
| 2006/0248391 A1 * | 11/2006 | Glover et al. ................... | 714/30 |
| 2007/0207800 A1 * | 9/2007 | Daley et al. ................... | 455/425 |
| 2008/0222612 A1 * | 9/2008 | Glotzbach et al. ............ | 717/127 |
| 2008/0295077 A1 * | 11/2008 | Sengupta et al. ............. | 717/124 |
| 2010/0174948 A1 * | 7/2010 | Glotzbach et al. ............. | 714/38 |
| 2010/0191941 A1 | 7/2010 | Yamagata et al. | |

OTHER PUBLICATIONS

Miron Abramovici et al., "A Reconfigurable Design-for-Debug Infrastructure for SoCs", DAC 2006, Jul. 24-28, 2006, pp. 7-12.
Miron Abramovici, "In-System Silicon Validation and Debug", IEEE Design & Test of Computers, 2008.
Robert Mijat, White Paper, "Better Trace for Better Software, Introducing the new ARM CoreSight System Trace Macrocell and Trace Memory Controller", 2010 ARM Limited, 12 pages.

* cited by examiner

*Primary Examiner* — Bryce Bonzo
*Assistant Examiner* — Jeison C Arcos
(74) *Attorney, Agent, or Firm* — Blakely, Sokoloff, Taylor & Zafman LLP

(57) ABSTRACT

Methods, machine-readable tangible storage media, and data processing systems that enable a debug host device to acquire memory dump information from a debug target device after the target device suffers an unrecoverable system malfunction are disclosed. In one embodiment, data in the volatile memory on a debug target device is accessed via a hardware integrated debug framework, which is also used to access data on a nonvolatile electronically erasable semiconductor memory of a debug target device, and one or more registers of one or more processors on a debug target device, and a core dump is created on the debug host device.

26 Claims, 9 Drawing Sheets

ENHANCED DEBUGGING FOR EMBEDDED DEVICES

BACKGROUND OF THE DISCLOSURE

When conducting debug operations on hardware or software during a mobile device's development stage, defects in the hardware or software can cause system malfunctions that lead to the failure or halt of a program's execution, also known as a "crash." Generally, the device's operating system will capture a snapshot of the program's memory in volatile (DRAM) memory, and the program's memory state, and write the snapshot in the form of a "core dump" to nonvolatile storage on the device. In addition to the program's memory, a core dump can also include other system state information such as processor register contents or the state of various hardware components. This information is useful when conducting offline or off site debugging when real time debugging is too expensive, impractical, or time consuming. In that instance, a core dump is a method by which software developers can analyze software failures to determine the cause of the failure, and remedy the issue.

When a running program encounters a fatal error, most operating systems will automatically generate some form of a core dump. For programs running in user memory space, the core dump is limited to the volatile memory associated with that particular program, and such failures generally do not impact overall system stability. However, some failures are of a severity that the entire system is affected. For example, a malfunction in critical operating system components can result in a system wide crash, and an operating system core dump of volatile memory is generated to assist in debugging. However it is possible that the system failure results in a sudden halt of system operations, or is of the type or severity that a core dump cannot be generated. In that instance, if the system were to shut down or restart without creating a core dump, the state of the system would not be preserved for subsequent debugging. Data in volatile memory could be lost if the system loses power or resets, and while data in nonvolatile memory could be preserved, it can remain inaccessible if the system cannot successfully restart.

SUMMARY OF THE DESCRIPTION

Methods, machine-readable storage media, and systems are disclosed that enable a debug host device to acquire crash dump information from a debug target device after the target device suffers a fatal system malfunction. In one embodiment, data in the volatile memory on a debug target device can be accessed via a hardware integrated debug framework, which can also be used to access data on a nonvolatile, electronically erasable semiconductor memory of a debug target device. In one embodiment, one or more registers on one or more processors of a debug target device can also be accessed. In one embodiment, data from the volatile memory and nonvolatile memory, as well as processor register information, can be copied to the debug host device via the hardware integrated debug framework, and used to create a core dump of the debug target state. A core dump can be created on a networked debug host device and uploaded over a network for debugging, or debug host device can be remotely attached to a debug target through a network.

In another embodiment, a host debug device pulls only a selected portion of data in the volatile memory, such as Dynamic Random Access Memory (DRAM), of the debug target device, and that selected portion can be limited to memory locations allocated to an operating system, such as the operating system's kernel. The selected portion can be determined from one or more page tables retrieved by the host debug device from the debug target device, and these page tables can be analyzed to determine the selected portion. The analysis can involve reading one or more markers in these page tables, wherein the markers specify that the marked memory locations contain data (e.g. software) of the operating system, such as the operating system's kernel.

In one embodiment, a method, at the debug host device, for obtaining only a selected portion of the data in the volatile memory can include the following operations: accessing, through an external debug interface (such as a JTAG interface) on a debug target device, a hardware integrated debug framework of a System on a Chip (SOC) integrated circuit; copying, via the hardware integrated debug framework, one or more page tables on one or more processors from the debug target device to the debug host device through an external debug interface; analyzing page table entries in the page table to determine a subset of page mapped virtual addresses that contain kernel memory allocations; accessing, through the hardware integrated debug framework, one or more physical memory addresses containing kernel memory allocations on the debug target device; and copying, though the external debug interface, one or more blocks of memory stored at the one or more physical memory addresses on the debug target device.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
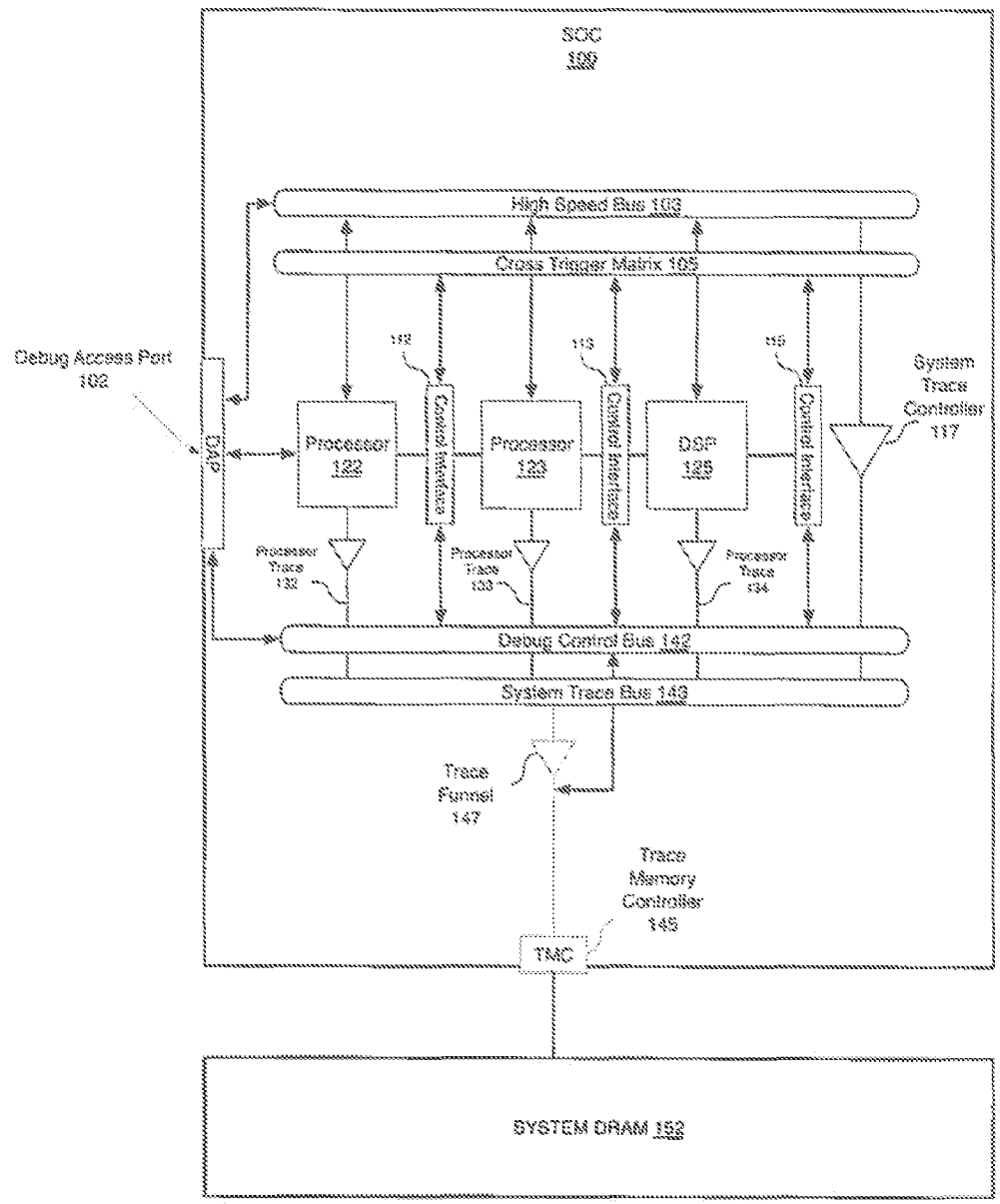
FIG. 1 is a block diagram illustrating one embodiment of a hardware integrated modular debug framework.

Most operating systems have a software component, known as the "kernel", that is responsible for managing access to the hardware for other software components. The kernel ages access to hardware resources by, among other functions, scheduling and dispatching commands or data to the hardware components of the system, or granting applications access to specific areas of system memory. An unrecoverable kernel failure can halt all program execution by the operating system because programs running on the system can no longer dispatch commands or data to the hardware. In some instances, a hardware failure can electrically disable certain components on the system and prevent one or more processors on a system from executing commands. In other circumstances, a major failure in the operating system kernel can leave the system in an unstable, but still operable state. Continued execution of programs, however, can result in permanent damage to the system, such as, for example, a loss of data on nonvolatile storage, in the event file system routines become unstable. Additionally, on multi-user systems, an unstable kernel can result in security breaches in which untrusted software is able to access private or trusted areas in memory. Accordingly, when a severe instability is detected by the operating system, most operating systems intentionally stop execution of all running programs and bring the system to a halted state.

In UNIX based operating systems, such failure is referred to as a "kernel panic." When a kernel panic occurs, further program execution is immediately halted, panic entries are written to system logs and a complete or partial core dump of the system is generated. If a system encounters a sudden or severe malfunction that renders it unable to generate panic logs or a core dump, then debug information useful to resolving the malfunction can be lost.

Disclosed herein are methods and apparatuses for enabling enhanced debugging on embedded devices. Numerous specific details are set forth in the following description to provide a thorough explanation of embodiments of the present invention. It will be apparent, however, to one skilled in the art, that embodiments of the present invention can be practiced without these specific details. In other instances, well-known components, structures, and techniques have not been shown in detail in order not to obscure the understanding of this description. Reference in the specification to "one embodiment" or "an embodiment" means that a particular feature, structure, or characteristic described in connection with the embodiment can be included in at least one embodiment of the invention. Additionally, the appearances of the phrase "in one embodiment" in various places in the specification do not necessarily all refer to the same embodiment.

In one embodiment, the hardware integrated debug framework is a series of hardware modules integrated into the bus architecture and processing modules of a system on a chip integrated circuit (SOC). The framework allows the components on the integrated circuit to be monitored and controlled without the use of invasive software debug techniques that interfere with or change the execution path of software on the systems to be debugged. Full system debug and trace is enabled by this framework by allowing debug access to individual processor and controller elements as they execute software commands. Beyond system trace and debug, the framework also allows individual control of system components integrated into the debug system.

The figures that follow depict processes that are performed by processing logic that comprises hardware (e.g. circuitry, dedicated logic, etc.), software (such as is run on a general-purpose computer system or a dedicated machine), or a combination of both.

FIG. 1 illustrates a block diagram of one example of a system on a chip (SOC) integrated circuit containing an embodiment of a hardware integrated debug framework. In one embodiment, such framework creates a debug and control structure that allows the individual components of a system to be monitored during program execution, or in the event of a system failure, to be controlled externally to assess the state of individual system components. The framework can be arranged as a series of modules which couple with devices and resources on the SOC to enable access, trace, debug, and control independent of the normal execution path of the system. In one embodiment, the debug interface of the SOC is accessible via a debug access port 102. The debug access port allows, in one embodiment, access to a debug control matrix 105 which connects the individual debug control interfaces 112, 113, 115 to each other and to the system trace controller 117. Through the debug control matrix 105, hardware events such as interrupts, signals, breakpoints, and commands can broadcast throughout the system to enable debug or control of the internal components attached to the matrix. In one embodiment, a processor with one or more cores 122 can connect through a debug control interface 112, which is connected to the debug control matrix 105 and a debug control bus 142. The debug control bus 142 can be an Advanced Peripheral Bus (APB), or some other SOC peripheral bus with similar functionality. The debug control bus 142 can also connect to a control interface 113, which is attached to a second processor with one or more cores 123. Special purpose processors, such as a digital signal processor (DSP) 125 can also couple with a control interface, such as control interface 115 which can also couple with the debug control bus 142.

In one embodiment, system trace controller 117 provides the ability to track the execution of software running on the SOC processor devices 122, 123, 125. In one embodiment, the SOC processor devices, processor 122, processor 123, and DSP 125 are coupled via a high-speed bus 103, which may be an Advanced Microcontroller Bus Architecture (AMBA) bus such as an AXI bus, or some other high performance bus. The system trace controller 117 can couple to the same high-speed bus 103 that the SOC processors 122, 123, 125 use to communicate with each other and the rest of the system. This coupling allows SOC devices to push execution trace data through the system trace infrastructure utilizing the system trace controller 117. In one embodiment, processor 122 trace data is driven to system trace bus 143 via processor trace output 132. Processor 123 can drive trace data to the system trace bus 143 via processor trace output 133. Additionally, a DSP 125 can use processor trace 134 to drive trace data to system trace bus 143. In one embodiment, data from all trace sources are consolidated into one stream via trace funnel 147, from which the data can be written to multiple output data sources, including volatile memory, or transmitted directly to a debug host device via an external debug interface coupled to the debug access port 102. The trace memory controller 145 enables the trace and debug framework to access and write to volatile system memory, which is, in one embodiment, system DRAM 152.

Figure 2:
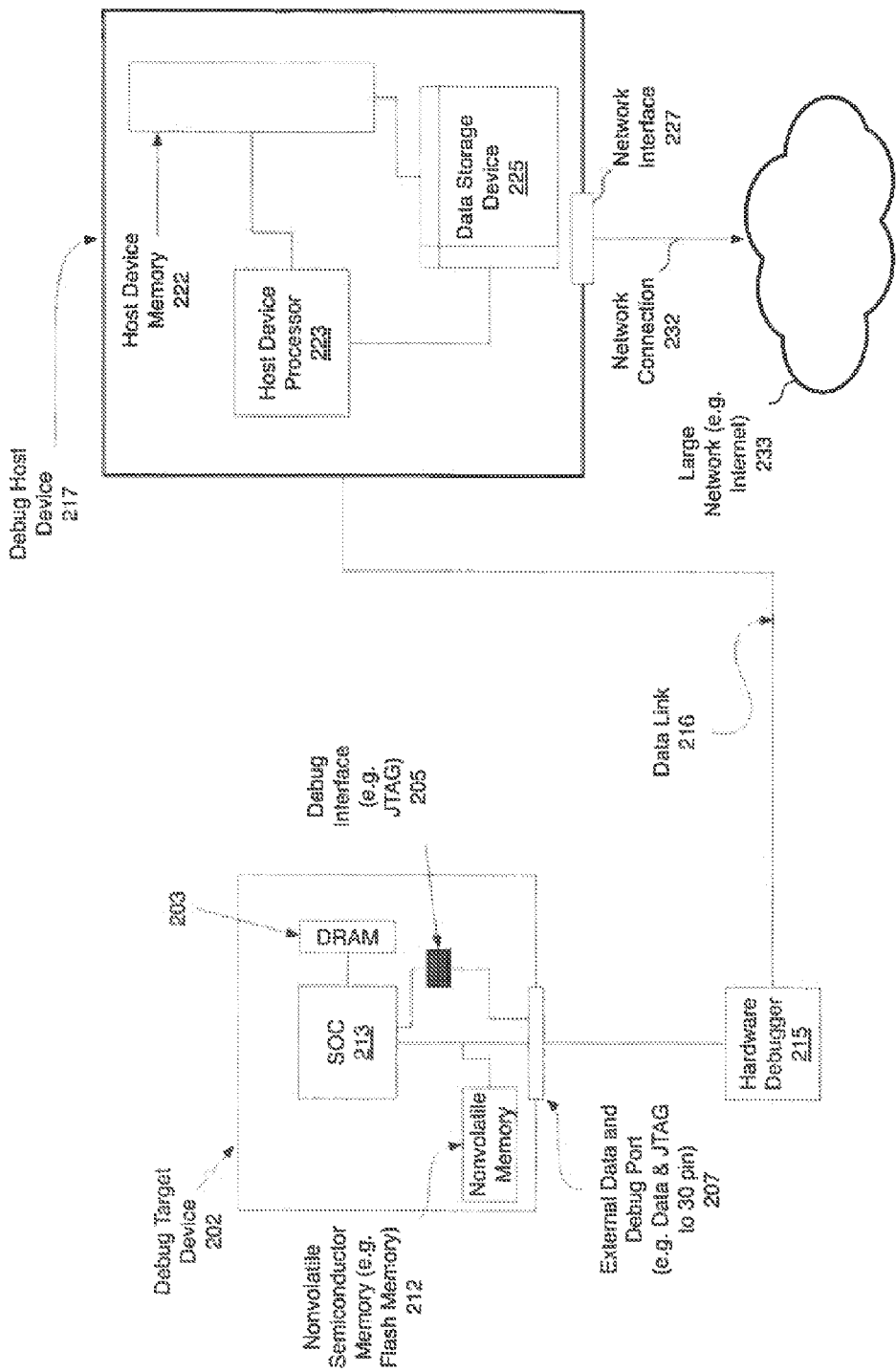
FIG. 2 is a block diagram illustrating one embodiment of a debug target device, external hardware debugger, and a debug host device.

In one embodiment, when a system failure occurs that halts system operation before a debug core dump is produced, a debug target device can be controlled externally using an embodiment of the hardware integrated debug framework as illustrated in FIG. 1. FIG. 2 is a block diagram overview illustrating one embodiment of a postmortem debug solution including a debug target device 202, external hardware debugger 216, and a debug host device 217 that allows the extraction of core dumps from a failed mobile electronic device.

In one embodiment, the debug target device 202 contains an SOC 213, volatile, random access DRAM 203, and non-volatile memory 212, and can be debugged via a hardware debugger 215 attached via a data port 207. The data port 207 can be coupled internally to the SOC debug access port (e.g. debug access port 102 as in FIG. 1) via a debug interface 205, which can be a JTAG port or some other serial debug port. The data port 207 can couple externally to an external data connector, which can be a multi-pin data connector, a Universal Serial Bus connector, or some other data connector, and provides access to both system data input/output as well as debug input/output. In one embodiment, hardware debugger 215 acts as a junction between the debug target device 202 and the debug host device 217. Commands for the hardware integrated debug framework can be abstracted by hardware debugger 215 specific commands. The debug host device 217 can then issue abstract commands to the hardware debugger 215 that are translated into commands for the internal debug framework in the SOC 213 of the debug target device 202. The hardware debugger 215 can be connected to the debug host device 217 via a data link 216, which can be a host-client link, such as a Universal Serial Bus connector, or a network link such as Ethernet.

In one embodiment, debug host device 217 is a data processing system containing a host device processor 223, a host memory device 222, and a nonvolatile data storage device 225. The debug host device 217 can contain a network interface 227 which provides a network connection 232 to a large network 233 such as the internet over which debug information can be communicated, or system debug snapshots can be transmitted. In the event of a debug target system crash from which the debug target device 202 cannot create a core dump, one embodiment of the debug host device 217 can use the hardware integrated debug framework of FIG. 1 to control the internal components of the target debug device. Using the cross trigger matrix 105 and debug control bus 142, commands, interrupts, and other hardware messages can be transmitted to the various components of the SOC and discreet components can be reset to allow external control of a failed debug target system without initiating a complete system reset.

In one embodiment, the hardware debugger device 215 can contain special purpose hardware or programmable hardware that can substitute for portions of hardware, software, or device drivers that would otherwise run on the debug target device. In one embodiment, the hardware debugger 215 can reset discreet components, download firmware, and restart specific devices on the debug target device 202 or the SOC 213 to allow debug access after a fatal system error. In one embodiment, the debug host device 217 can direct a series of abstract commands to a hardware debug device programmed with specific details as to the low level operation of the debug target device and hardware integrated debug framework. The hardware debugger 215 can then function as a debug accelerator device to perform in hardware what the debug host device would otherwise direct in software via a processor, such as the host device processor 223.

Supplemental hardware functionality in the hardware debugger 215 also allows the debug target device 202 to be remotely situated from the debug host device 217. For example, if the data link 216 is a long distance network connection with a high latency or low data rate, pulling a core dump from the debug target device can consume a large amount of time if the command stream for the debug framework originates entirely from the debug host device 217. Incorporating logic to control the hardware integrated debug framework into the hardware debugger 215 can reduce the time required to initiate the core dump pull from the debug target device. 202.

In one embodiment, special purpose or programmable hardware in the hardware debugger 215 can be supplemented or replaced by a software driver stack running on the debug host device 217. In such embodiment, software elements that can no longer execute on the debug target device 202 due to a system failure or a kernel panic can be replaced with a driver running on the debug host device 217. In one embodiment, a logic block implemented in hardware on the debug target device can be simulated by the debug host device and used to replace nonfunctional logic blocks on the debug target device. In this instance, the data link 216 is a high speed data link to facilitate the simulation, and a core dump pulled from the debug target device can be transmitted over the network interface 227 to a second debug host device for remote debug. For example, if a debug target device 202 is in a kernel panic state and the operating system is no longer executing commands, but the hardware of the debug target device 202 is functional, a block device driver or file system driver running in a section of host device memory 222 designed to simulate the memory space of the debug target device 202 can serve as a temporary replacement. In one embodiment, a full software simulation of the debug target device 202 emulates various components as necessary to extract a core dump from the debug target device 202 if it is in a fully halted or kernel panic state. In one embodiment, the core dump from the debug target device 202 can include data from both volatile DRAM 203 and nonvolatile semiconductor memory 212. In one embodiment, file system information can be separately extracted from the target device and used to reconstruct the target device's file system on the debug host device.

Figure 3:
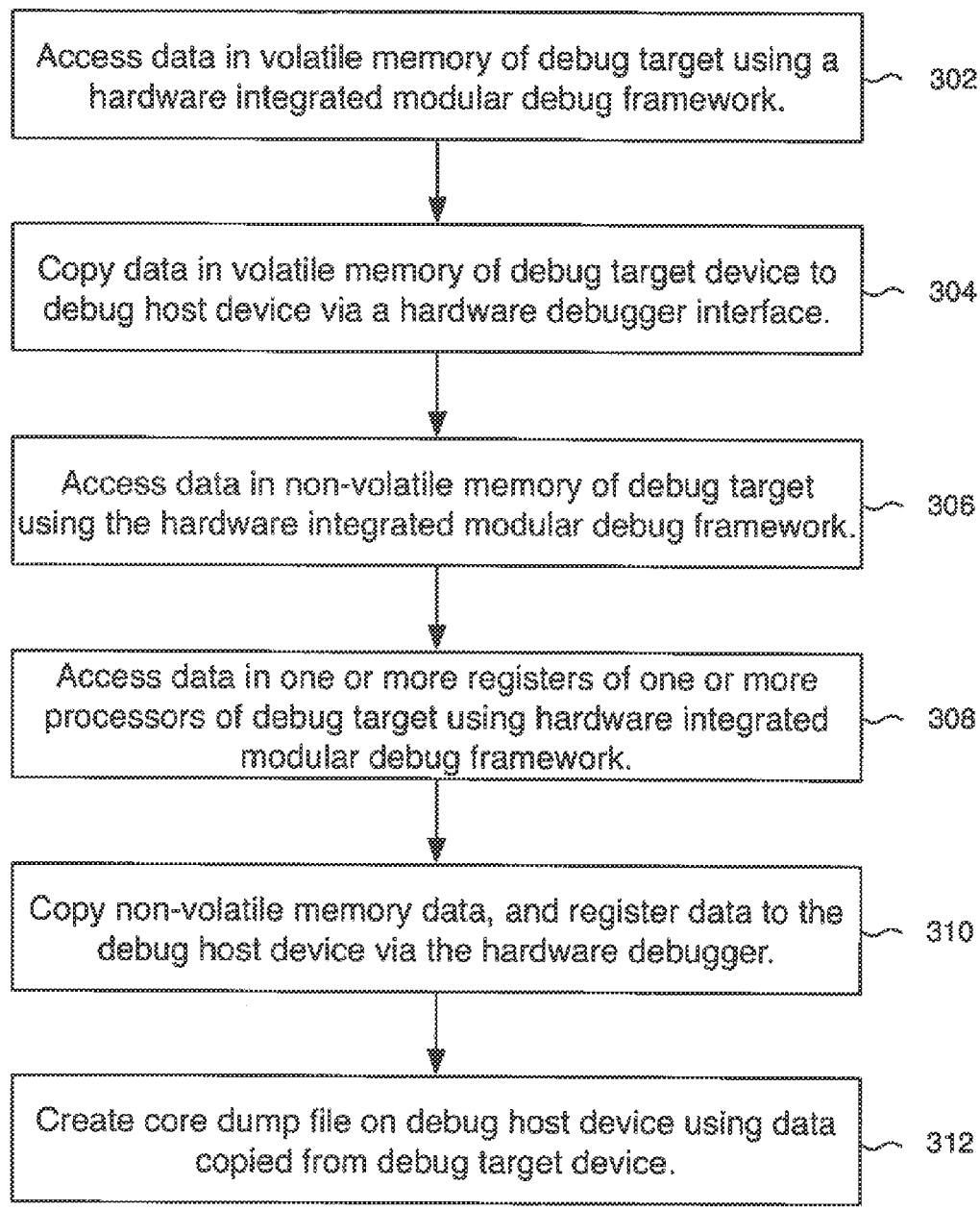
FIG. 3 is a flow diagram illustrating one embodiment of a method of pulling data from a debug target device to create a core dump file.

FIG. 3 is a flow diagram illustrating one embodiment of a method of pulling core dump information from a debug target device. It will be understood that the order of operations shown in FIG. 3 can be changed in alternative embodiments, which can have fewer operations. Additionally, while processes are described below in terms that include some sequential operations, some of the operations described may be performed in parallel rather than sequentially. When a debug target system undergoes a kernel panic, or related operating system level failure, without generating a core dump, or some equivalent device state snapshot, software on a debug host device can pull the core dump data from the target system rather than relying on the target system to generate the core dump at the time of failure. As indicated in operation 302 of FIG. 3, a debug host device can use the various modules of the hardware integrated debug framework to access data in volatile memory of the debug target. In one embodiment, the debug host device accesses the volatile memory by initiating a process to pull the data (rather than have the target device push the data to the debug host device). If the debug target system underwent a particularly catastrophic system failure, certain components within the debug target system may need to be reinitialized by the debug framework before access to the volatile memory of the debug target device can be established. Such re-initialization can be specific failure recovery initialization, or follow a method similar to that used initialize the device from a powered-off state. In one embodiment, once the debug framework and device hardware are in a ready state, operation 304 on the debug host device can command the integrated debug framework to copy some or all of the system memory out to the hardware debugger, where it can be relayed to memory in the debug host device (e.g. host memory device 222 of FIG. 2).

In one embodiment, in operation 306 the debug host device can use the hardware integrated debug framework to access the nonvolatile memory of the debug target device. Unlike the volatile memory of the debug target device, data will generally not be lost if the halted system is reset, and traditionally a system that suffers a severe operating system error without generating a core dump is reset and log files may be analyzed after system reboot. However, if the debug target device repeatedly fails at system boot time, the system log files can be inaccessible and the boot failure may be difficult to debug. Additionally, while removing the storage device for analysis is an alternative in electronic devices utilizing removable storage, is not possible or practical when a debug target device uses data storage that cannot be removed, such as an electrically erasable semiconductor memory that is soldered to the device system board.

To assist a debugger in gaining access to data stored on a debug target device that is in a failed state, one embodiment, in operation 306 can give a debug host device access the nonvolatile storage of a debug target device. Just as in operation 304, some components on the debug target device may need to be reinitialized before the debug host device can gain sufficient access to the nonvolatile storage to retrieve data, the specifics of which will be further examined in FIGS. 7 and 8 below. In one embodiment, once access has been acquired, specific data from the nonvolatile storage device can be copied immediately to the debug host device, or cached temporarily on the debug target device before being copied, along with additional debug information, to the debug host device. In one embodiment, an operation 308 can be performed in which additional debug data traditionally included in a core dump, such as the register contents of one or more processors, or the device state of one or more additional system devices can also be accessed on the debug target device. In one embodiment, operation 310 can be performed by the debug host device, via a hardware debugger, in which the register and or device state data is transmitted to the debug host device in a burst data transfer along with the cached nonvolatile data previously gathered. In one embodiment, data from the nonvolatile device, processor register data, and device state information are instead transmitted as separate data transmissions.

While a debug host device can use a hardware debugger to access physical memory addresses on a debug target device, it may be more efficient to copy only the memory relevant to the failure mode of the debug target device. One approach to capturing the most relevant memory is to limit the memory copy to memory that is mapped into the virtual address space of the operating system at the time of system failure. Most operating systems which implement virtual memory abstract the physical addresses of memory locations to a different, virtual address space, where programs can be given what is apparently a contiguous block of memory space, but each block of addresses (e.g. memory "page") may actually be located at any of several non-contiguous locations in physical memory. Additionally, some implementations include sections of nonvolatile storage in the virtual address space, allowing a device's operating system to allocate more virtual memory than the device possesses in physical memory, or use nonvolatile storage as a backing store for some locations in the virtual address space.

Figure 4:
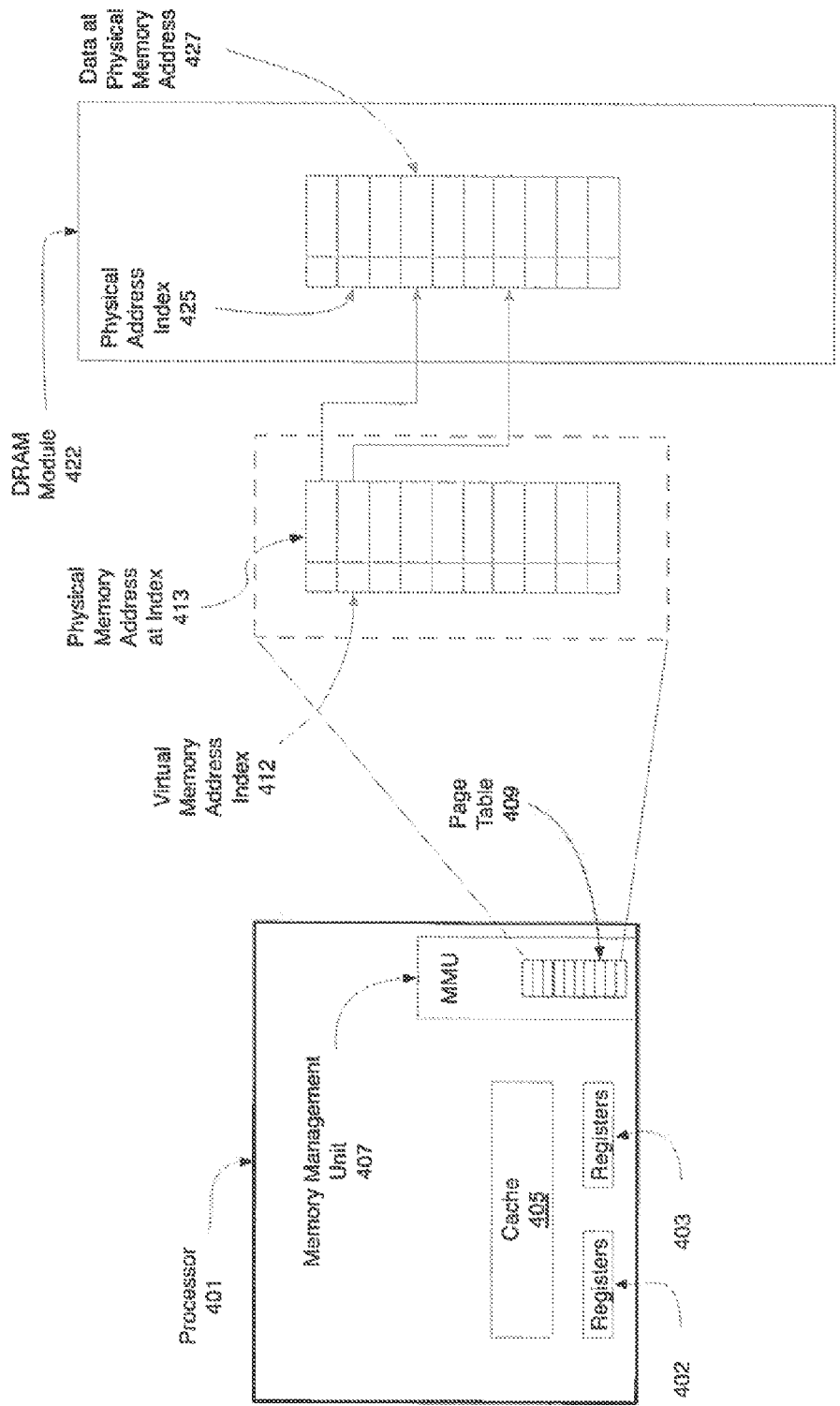
FIG. 4 is a block diagram illustrating the access of page table information from a processor device.
Figure 5:
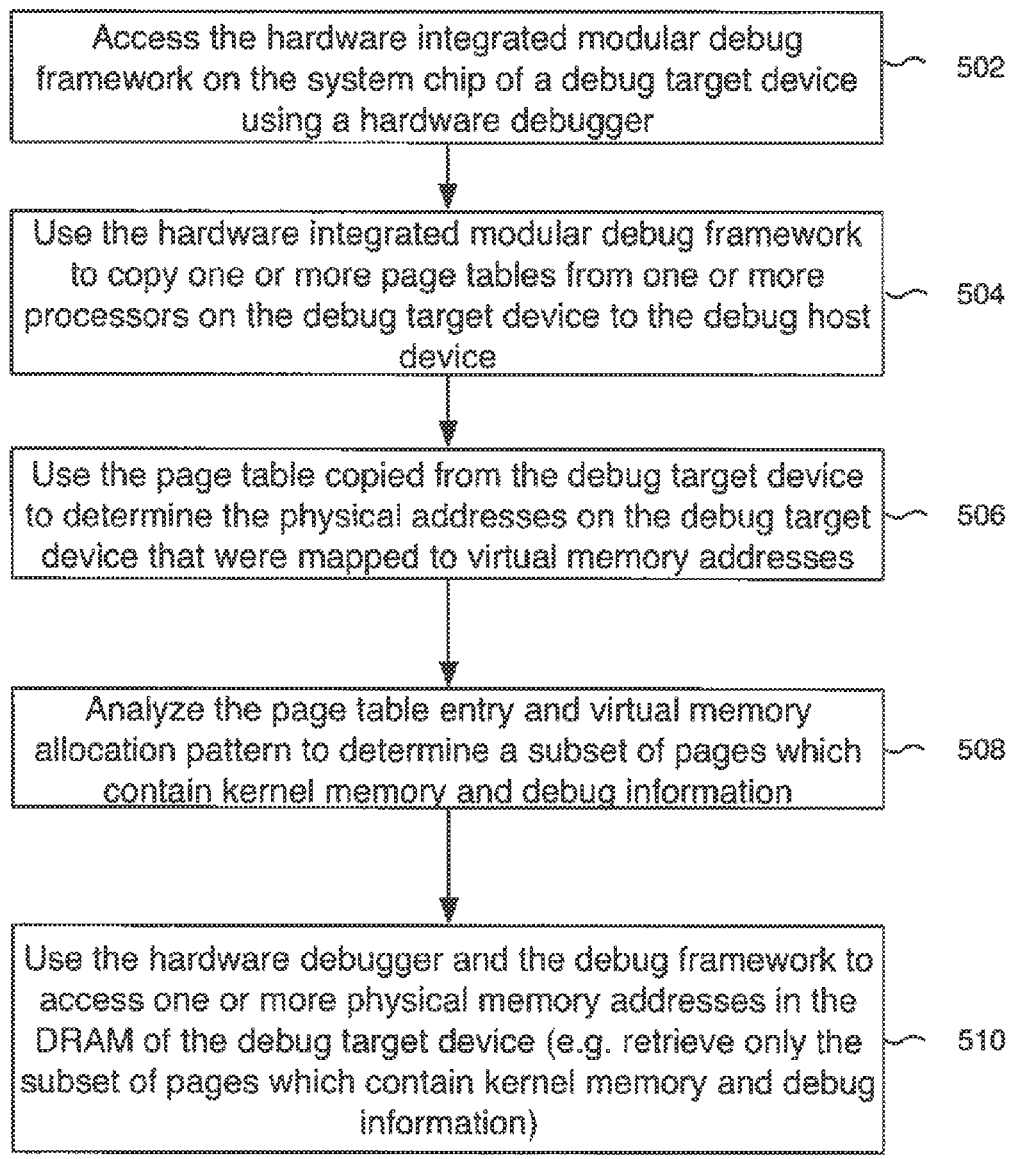
FIG. 5 is a flow diagram illustrating one embodiment of a method of pulling a memory snapshot from a debug target device to a debug host device.

When virtual memory consists of both volatile and nonvolatile memory, a page may reside in physical memory, or a page may be "paged out" to the secondary, nonvolatile memory. Pages in physical memory are ready to be accessed, or contain programs that are ready to execute on the device processor, but pages in nonvolatile memory generally are inactive. If a page in secondary memory is requested, a "page fault" occurs and the page is copied into system DRAM for use. In a sense, many virtual memory systems consider system DRAM to be a level of cache for virtual memory, with the nonvolatile storage consisting of the highest level of cache, with the highest capacity and the highest latency, and the processor cache consisting of lower level cache, with low capacity and low latency. In general, a virtual memory page is only useful to running programs if it is in at least the system DRAM level. In one embodiment, the memory snapshot portion of the core dump is limited to virtual memory addresses mapped into system DRAM or, optionally, the cache memory of one or more processors. Using this approach, a large amount of information that may be redundant or irrelevant can be avoided. Additionally, in systems where the data throughput of the external debug port is low, limiting the amount of memory captured in the snapshot can reduce the amount of time needed to create the core dump. FIG. 4 and FIG. 5 illustrate details on how, in one embodiment, limiting the memory snapshot is accomplished.

FIG. 4 is a block diagram illustrating one embodiment of a processor within an SOC integrated circuit of a debug target device. Processor 401 can be an example of the one or more processors 122, 123, or, in one embodiment, DSP 125, of FIG. 1. In one embodiment, the processor 401 contains a Memory Management Unit 407 (MMU), which accelerates the virtual memory to physical memory translation. The MMU 407 performs virtual to physical address translation using one or more page tables 409 containing multiple page table entries. Each page table 409 is a data structure that contains multiple elements of data containing the physical address of a page of memory. The size of the page of memory can vary from system to system and from processor to processor. Each element is indexed by the virtual address of the page of memory. Generally, a virtual memory address contains several bits, the number of bits corresponding to the size of the virtual address space. A portion of the bits will correspond to a virtual page related to the memory address, and a portion of the bits win correspond to a memory offset within the page. In one embodiment, the MMU translates a given input virtual address into an output physical address, if a physical memory address in DRAM exists for the input virtual address. In FIG. 4, virtual memory address index 412 corresponds to a physical memory address 413 stored within the index. If a virtual memory address is not backed by a physical memory address in system DRAM, (e.g. unmapped addresses or addresses mapped to nonvolatile memory) it will not be copied from the debug target system to the debug host system. If a virtual memory address has an associated physical address, then it can be copied from system ram to the debug host system. For example DRAM module 422 containing one or more physical addresses, such as physical address 425 and physical address 427, can be copied to the debug host system. In one embodiment, any memory stored in processor cache 405 can also be copied to the debug host system. Additionally, some or all of the processor registers, such as register set 402 and register set 403, can be copied to the debug host system as well.

FIG. 5 is a flow diagram illustrating one embodiment of a method of creating a memory snapshot of a debug target device that is in a panic or halted state after a severe hardware or software malfunction. In one embodiment, a debug host device can use a hardware debugger attached to a debug target device to perform an operation 502 which can grant the debug host device access to a hardware integrated debug framework on a system on a chip (SOC) integrated circuit, such as the integrated debug framework of FIG. 1. Once the framework is accessed, the debug host device can use the hardware debugger and debug framework to perform operation 504 to copy one or more page tables from memory using processor register information from one or more processors on the SOC, to the memory of the debug host device. The debug host device can use the one or more page tables to construct a picture of the virtual address space as existing on the debug target device at the time of failure. In one embodiment, the debug host device can perform operation 506 to determine the list of physical addresses, or physical address pages, that were mapped into virtual address space.

In one embodiment, the debug host device can additionally perform operation 508 to determine the subset of physical memory pages that may be of special interest when debugging a system failure. This subset may include pages marked by the kernel in the page table entry as "interesting" pages that should be pulled from the system in the event of a device crash. In one embodiment, a kernel programmer may be aware of known system instabilities when performing certain operations and can set a bit in the page table entry when mapping certain physical pages into virtual memory to mark those pages for later retrieval in the event of a system failure. These pages are then easily identifiable as memory addresses to retrieve in the event of a device failure. In one embodiment, the debug host device can analyze the mapping pattern from virtual memory to physical memory to determine which physical memory addresses should be copied. A debug host device, for example, may only wish to copy memory that was mapped for use by the kernel at the time of device failure, rather than copying all of the data in the memory. Various algorithms or heuristics can be employed to determine which subset of virtual memory, beyond explicitly marked page table entries as supported in one embodiment, should be copied from the debug target device to the debug host device.

In one embodiment, the page table entries can be scanned for the allocation of "superpages," or other large contiguous blocks of physical memory mapped as contiguous virtual memory. A superpage can be many times larger than the traditional 4-kilobyte page size supported by most processor devices. Some processors support superpage allocation of certain sizes natively, and will map such pages into the processor's page table. When analyzing the page table entry, the debug host device may wish to copy only physical addresses stored within a superpage allocation, or alternatively, copy only physical address pages stored outside of a superpage allocation, depending on the virtual memory addressing algorithm in place. In one embodiment, a debug host device, having generated a list of physical memory addresses to copy from the debug target system, can, in operation 510, copy the physical memory pages indicated by the list of addresses from the debug target to the debug host device using the hardware debugger and hardware integrated debug framework.

Figure 6:
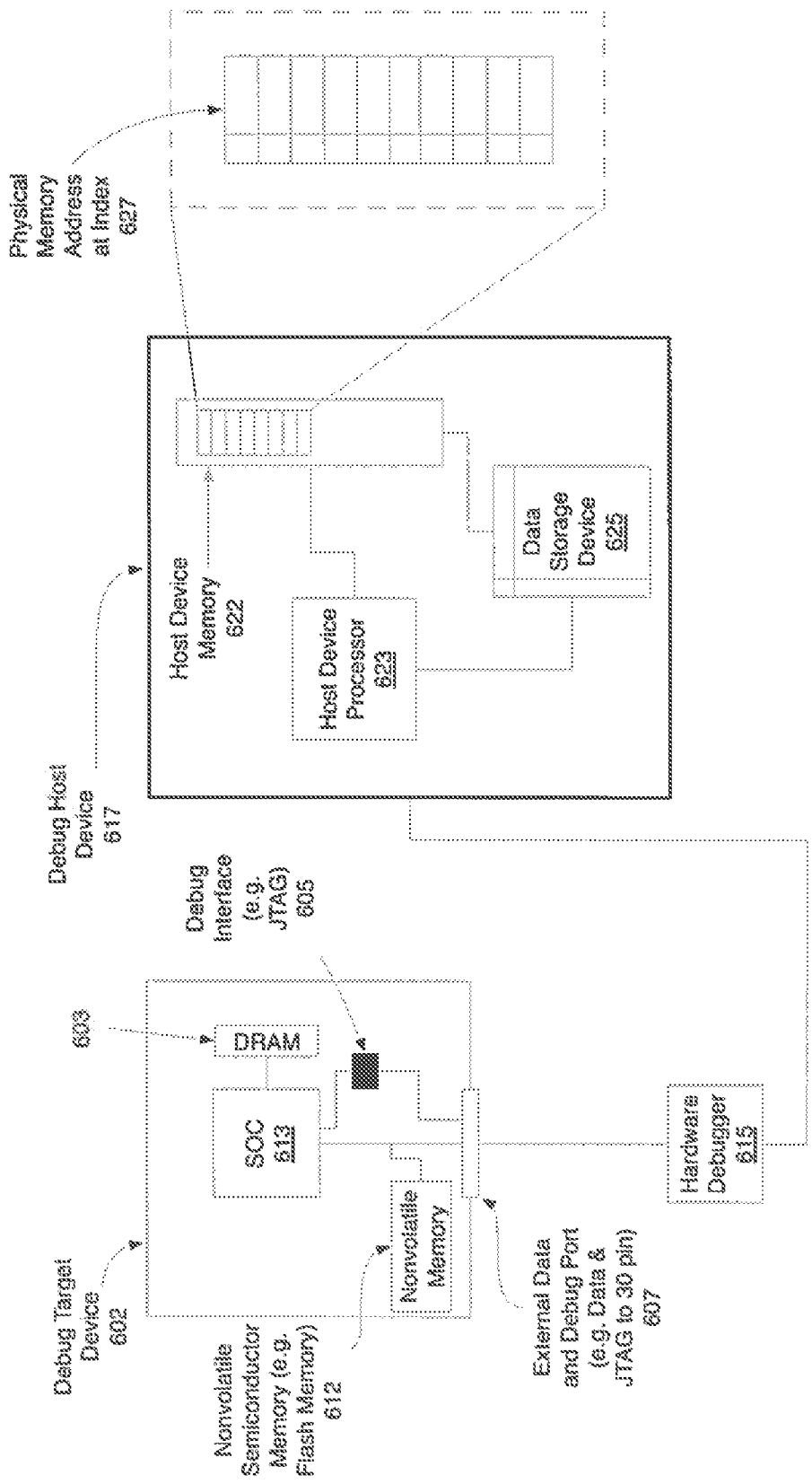
FIG. 6 is a block diagram illustrating one embodiment of a debug host device accessing the volatile memory on a debug target device using a copy of page table information from a processor on the debug target device.

FIG. 6 is a block diagram illustrating one embodiment of a debug target device 602, hardware debugger 615, and debug host device 617 that can implement an embodiment of the method show in FIG. 5. As demonstrated in FIG. 5, in one embodiment, the debug host device 602 can gain access to the hardware integrated debug framework on the system on a chip (SOC) integrated circuit 613 and use the hardware debugger 615 to copy one or more page tables using one or more processors on the SOC 613 to the memory of the debug host device 622. The hardware debugger 615 couples to the debug target device 602 via an external data and debug port 607, which can be coupled internally to both the SOC debug interface 605 and a data bus of the debug target device 602. The debug host device 617 can use the one or more page tables to construct a picture of the virtual address space as existing on the debug target device 602 at the time of device failure. In one embodiment, the debug host device 617 can determine the list of physical addresses, or physical address pages, that were mapped into virtual address space at the time of system failure. The debug host device 617 can then copy the physical pages containing the list of physical addresses, or indicated by the physical address pages, from the DRAM 603 of the debug target device via the SOC 613 and the SOC debug interface 605, which may a JTAG interface or some other serial debug interface. The SOC debug interface 605 can couple with the hardware debugger 615 via a data port on the debug target device, which can be a dedicated debug port, or a combined debug and general purpose data port, such as a 30 pin data port as is common on mobile electronic devices from Apple Inc. of Cupertino, Calif.

In one embodiment, the debug host device 617 can directly manage the hardware integrated debug framework on the SOC 613 of the debug target device 602, using software executing on the host device processor 623. Additionally, the hardware debugger 615 can contain special purpose or programmable hardware that accelerates the debug operations performed by the debug host device 617. In one embodiment, a debug host device, 617 having generated a list containing a set of physical memory address pages 627 containing the physical memory addresses to copy from the debug target system, can reconstruct a virtual memory address space from the debug target device 602 in the host device memory 622 of the debug host device 617. In conjunction with processor register data, and other device state copied from the SOC 613 of the debug target device, the debug host device can write a crash dump file to a data storage device of the debug host device for later analysis. In one embodiment, data from the nonvolatile memory 612 of the debug target device 602 can also be copied and stored in conjunction with the crash dump on the data storage device 623 of the debug host device 617. In one embodiment, the data from the nonvolatile memory 612 of the debug target device 602 can be used to reconstruct the target device's file system on the debug host device. The crash dump data can also be transmitted over a network for remote analysis as shown in FIG. 2.

Figure 7:
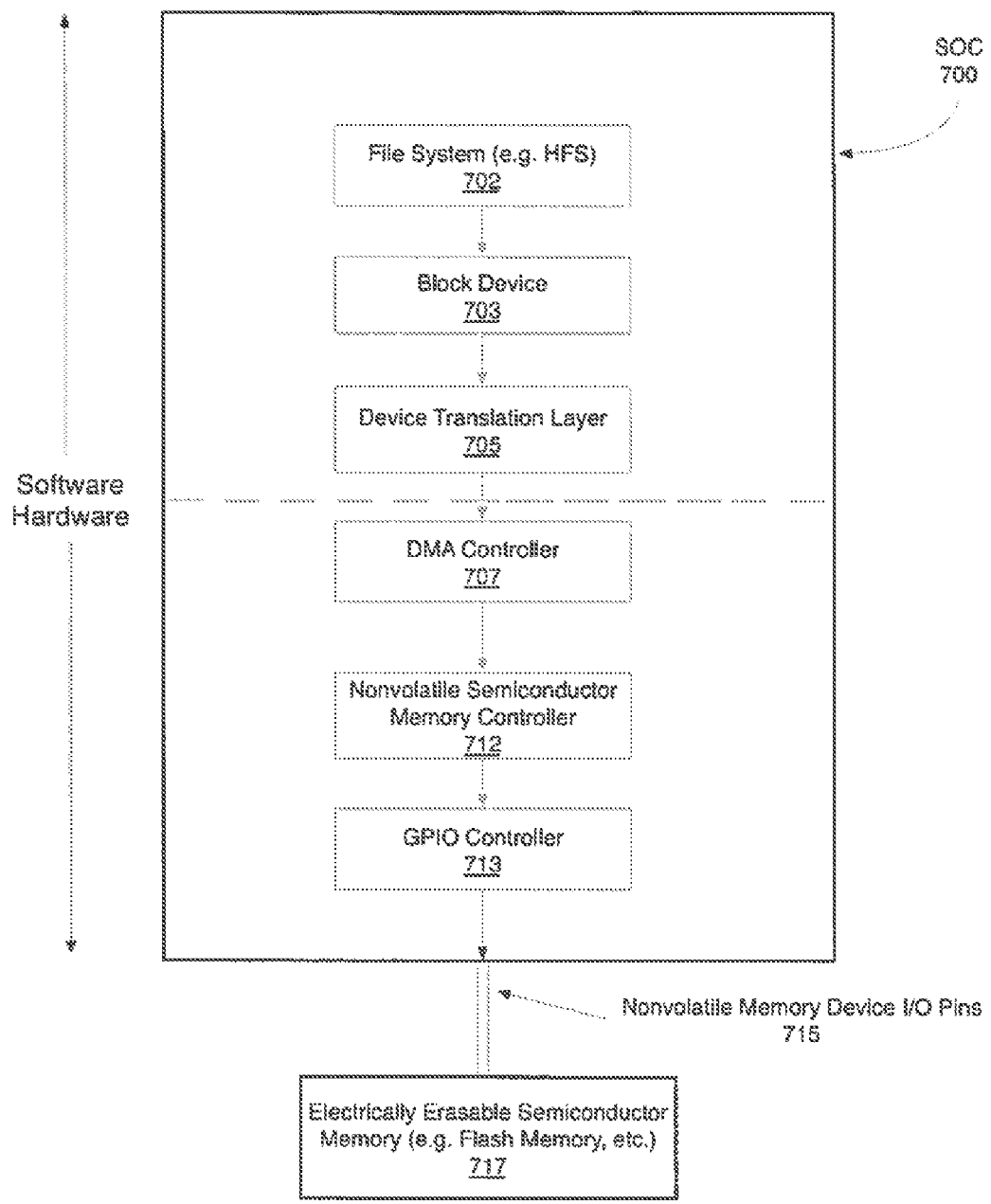
FIG. 7 illustrates a block diagram of one embodiment of a system to access an electronically erasable semiconductor memory device on a debug target device.

Accessing semiconductor based nonvolatile storage at the hardware level is more complicated than accessing a traditional hard disk drive. FIG. 7 is a block diagram showing an example of the software and hardware components that are involved in one embodiment of a mobile device subject to the debug conditions of an example debug target device as illustrated in FIG. 2 and FIG. 6. At the highest level of abstraction, an electrically erasable semiconductor memory device appears as a file system 702, which acts on a logical block device 703, as is the case for hard disk storage devices. However, in the case of a semiconductor memory device, a device translation layer 705 will manage access to the memory device. For example, a NAND flash device is generally accessed on a page by page level, rather than using bit by bit random access. Accordingly, a device translation layer 705, in this case, a flash translation layer, will present the flash device as virtual block device that is compatible to logical block device 703, to hide the complexities of accessing the device by abstracting device operations such as page to block mapping and wear leveling operations.

At the hardware level, a direct memory access, or DMA controller 707 controls direct memory access operations from device to device on the system so that a system processor of the device does not have to directly master each data transfer from one system device to a second system device. The DMA controller 707 controls a nonvolatile semiconductor memory controller 712 that is programmed with knowledge of the command sequences used to control reads and writes to the nonvolatile memory at the device level. Nonvolatile semiconductor memory, such as an electrically erasable semiconductor memory, can take several forms. In one embodiment, flash memory is used, which can be in the form of NAND flash memory, NOR flash memory, SONOS flash memory, or some other variant of floating gate transistor memory, but is not limited as such. Depending on the memory technology used, the nonvolatile semiconductor memory controller 712 is programmed specifically for the type of memory device it is used to access. The nonvolatile semiconductor memory controller device 712 can couple to a general-purpose input-output interface (GPIO) such as GPIO controller 713. The GPIO controller 713 can electrically couple to the general-purpose input-output pins of an electrically erasable semiconductor memory device 717, which are used as control inputs by the semiconductor memory controller 712.

Figure 8:
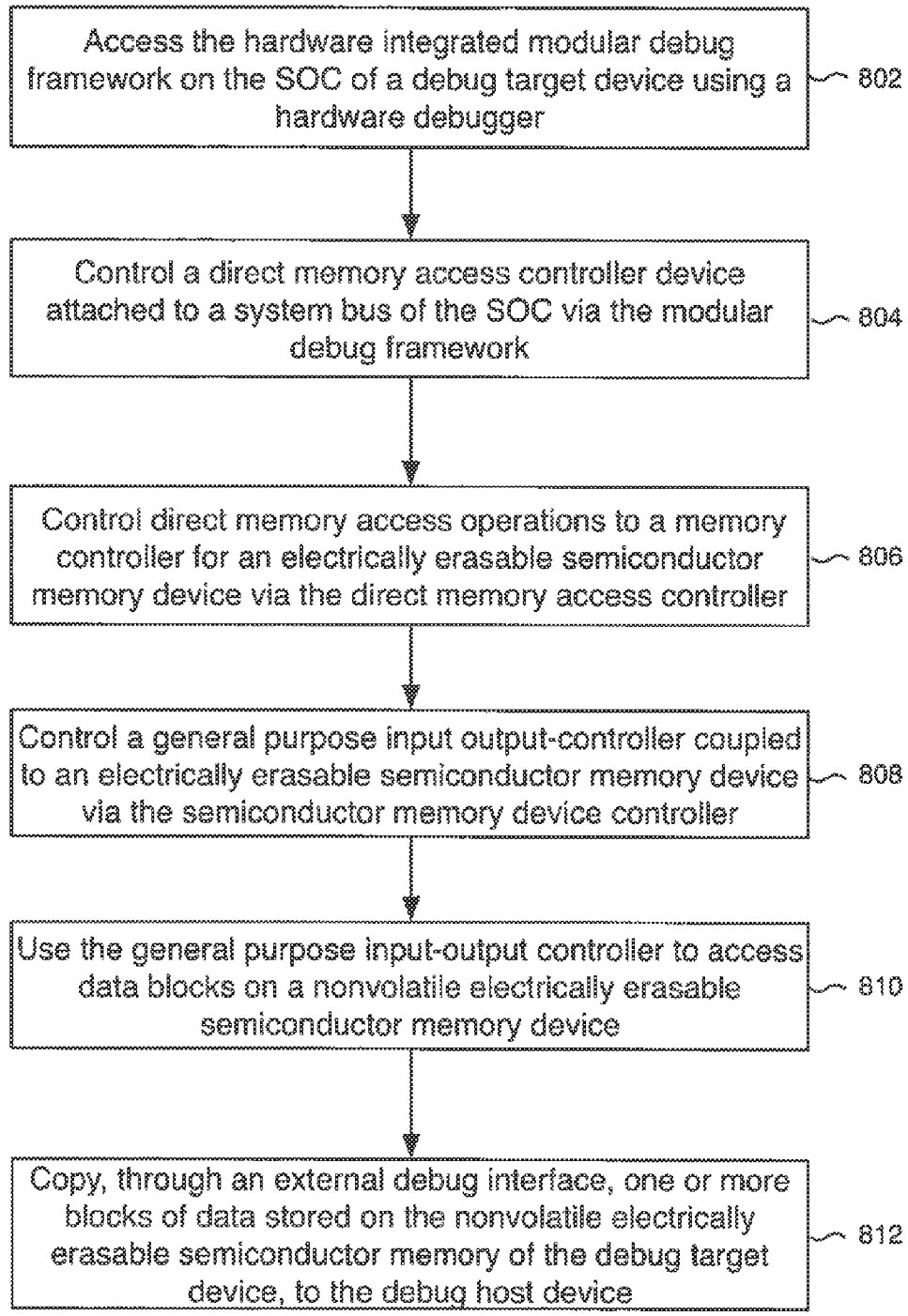
FIG. 8 is a flow diagram illustrating one embodiment of a method of pulling data from the nonvolatile semiconductor memory of a debug target device.

FIG. 8 is a flow diagram illustrating one embodiment of a method of accessing an electronically erasable semiconductor memory device that is acting as nonvolatile storage on a debug target device. A debug host device, via a hardware debugger, will access the hardware integrated debug framework of the SOC used in the debug target device in operation 802. Operation 802 can occur in a separate transaction from the processor register read, device state read, or system memory read as discussed above, or all debug framework operations can occur in the same transaction. The debug host device, via, or in conjunction with the hardware debugger, can then direct the debug framework to access a direct memory access (DMA) controller in operation 804. The DMA controller directs input and output operations for devices on an SOC system bus, such as the high performance bus 103 as in FIG. 1. In operation 806, the DMA controller can control DMA operations to a semiconductor memory controller device, such as the nonvolatile semiconductor memory device 717 of FIG. 7. The nonvolatile semiconductor memory controller device can use a general purpose input and output (GPIO) controller (e.g. GPIO controller 713) to access the control pins of a semiconductor memory device and provide commands to a memory device microcontroller embedded within the chip of the memory device. Accordingly, the hardware integrated debug framework can drive a DMA controller, which can control a nonvolatile semiconductor memory device, which, in operation 808 can control a GPIO controller coupled to the input output pins of the semiconductor memory device.

In one embodiment where the chain of controllers in the SOC can be used to access an electrically erasable semiconductor memory device in the manner described above, operation 810 can use the GPIO controller to drive the input output pins of a semiconductor memory device in a manner that allows access to one or more data blocks stored on the nonvolatile electrically erasable semiconductor memory device. In operation 812, one or more blocks of data stored on the nonvolatile memory device can be copied out of the debug target device through the debug interface and the hardware debugger, to the debug host device. On the debug host device, those blocks of data can be used to assemble a core dump, or can be stored in conjunction with a core dump assembled from device state information, processor register information and one or more memory snapshots of the debug target device DRAM at the time of device failure.

Figure 9:
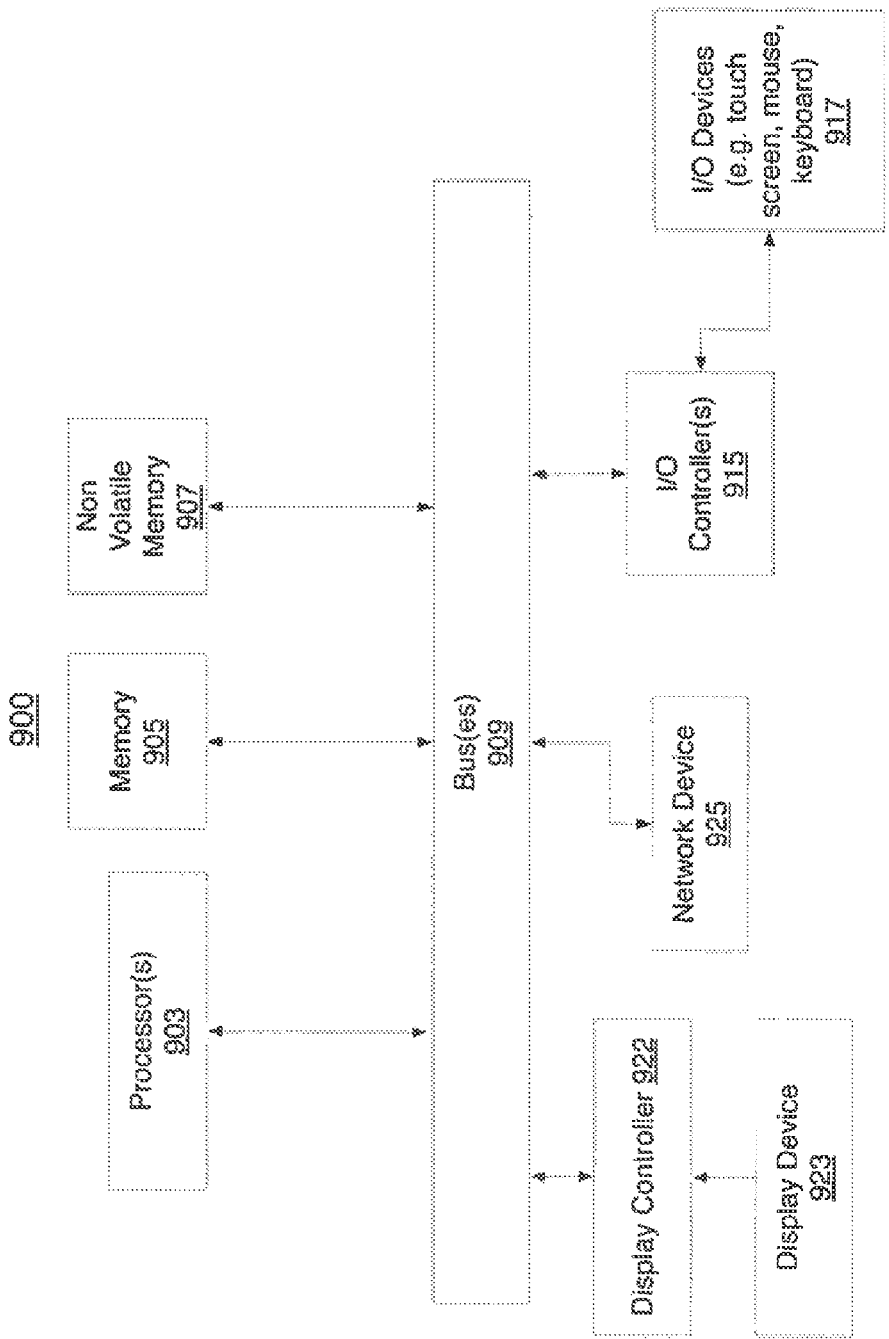
FIG. 9 illustrates a block diagram of a data processing system that can serve as a debug host device.

FIG. 9 shows one example of a data processing system, which may be used as a debug host device in the present debug system. Note that while FIG. 9 illustrates the various components of a data processing system, such as a computer system, it is not intended to represent any particular architecture or manner of interconnecting the components as such details are not germane to the present invention. It will also be appreciated that other types of data processing systems, which have fewer components than shown or more components that shown in FIG. 9, may also be used with the present invention. The data processing system of FIG. 9 may be a Macintosh computer from Apple Inc. of Cupertino, Calif. As shown in FIG. 9, the data processing system 900 includes one or more buses 909, which serve to interconnect the various components of the system. One or more processors 903, each containing one or more processor cores, are coupled to the one or more buses 909 as is known in the art. Memory 905 may be volatile Sequential DRAM, nonvolatile RAM or may be flash memory or other types of memory. This memory is coupled to the one or more buses 909 using techniques known in the art.

The data processing system 900 can also include nonvolatile memory 907 which may be a hard disk drive or a flash memory or a magnetic optical drive or magnetic memory or an optical drive or other types of memory systems which maintain data after all power is removed from the system. The nonvolatile memory 907 and the memory 905 can both couple to the one or more buses 909 using known interfaces and connection techniques. A display controller 922 is coupled to the one or more buses 909 in order to receive display data to be displayed on a display device 923 which can display any one of the user interface features or embodiments described herein. The display device 923 can include an integrated touch input to provide a touch screen. The data processing system 900 can also include one or more input/output (I/O) controllers 915 which provide interfaces for one or more I/O devices such as one or more mice, touch screens, touch pads, joysticks, and other input devices including those known in the art. The I/O controller can also provide interfaces for one or output devices (e.g. speakers). The input/output devices 917 are coupled through one or more I/O controllers 915 as is known in the art. Additionally, one or more network interfaces 925 can also be coupled to the one or more buses to provide access to one or more networks.

While FIG. 9 shows that the nonvolatile memory 907 and the memory 905 are coupled to the one or more buses directly rather than through a network interface, it will be appreciated that the data processing system can utilize a nonvolatile memory which is remote from the system, such as a network storage device which is coupled to the data processing system through a network interface such as a modem or Ethernet interface or a wireless interface, such as a wireless Wi-Fi transceiver or a wireless cellular telephone transceiver or a combination of such transceivers. As is known in the art, the one or more buses 909 may include one or more bridges or controllers or adapters to interconnect between various buses. In one embodiment, the I/O controller 915 includes a USB adapter for controlling USB peripherals and can control an Ethernet port or a wireless transceiver or combination of wireless transceivers.

It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 905 or the non-volatile memory 907 or a combination of such memories, and each of these memories is a form of machine readable, tangible storage medium. In various embodiments, hardwired circuitry may be used in combination with software instructions to implement the present invention. Thus the techniques are not limited to any specific combination of hardware circuitry and software or to any particular source for the instructions executed by the data processing system.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The present invention can relate to an apparatus for performing one or more of the operations described herein. This apparatus may be specially constructed for the required purposes, or it may comprise a general-purpose computer selectively activated or reconfigured by a computer program stored in the computer. It will be apparent from this description that aspects of the present invention may be embodied, at least in part, in software. That is, the techniques may be carried out by an apparatus in a data processing system in response to a processor executing a sequence of instructions contained in volatile or non-volatile memory, or a combination of such memories, which together may embody a non-transitory machine readable storage medium.

Non-transitory machine readable storage medium comprises any type of machine readable storage medium, including floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, as opposed to media specifically designed or designated for carrying transitory, propagating signals. In various embodiments, software-instructions stored on a machine-readable storage medium can be used in combination with hardwired circuitry to implement the present invention. Thus the techniques are not limited to any specific combination of hardware circuitry and software or to any particular source for the instructions executed by the data processing system associated an apparatus for performing one or more of the operations described herein.

What is claimed is:

1. A machine implemented method at a debug host device, the method comprising:
   accessing, via a hardware integrated debug framework, data in volatile random access memory of a debug target device;
   accessing, via the hardware integrated debug framework, data in a nonvolatile random access electrically erasable semiconductor memory device of the debug target device via a device translation layer for the semiconductor memory device;
   accessing, via the hardware integrated debug framework, one or more registers of one or more processors on the debug target device; and
   creating, on the debug host device, a debug target system snapshot comprising the volatile memory data, nonvolatile memory data, and data from one or more registers of one or more processors on the debug target device, wherein the debug target device has malfunctioned due to a failure.

2. The machine implemented method as in claim, 1 wherein accessing data in volatile memory of a debug target device comprises:
   accessing, through an external debug interface, the hardware integrated debug framework;
   copying, via the hardware integrated debug framework, one or more page tables on one or more processors from the debug target device to the debug host device, through the external debug interface;
   accessing one or more physical memory addresses on the debug target device using virtual memory mappings listed in one or more page tables copied from one or more processors on the debug target device; and
   copying, to the debug host device, one or more blocks of memory stored at the one or more physical memory addresses on the debug target device.

3. The machine implemented method as in claim 2, wherein the hardware integrated debug framework is accessed through an external debug interface by a hardware debug device coupled to the external debug interface and the debug host device, and wherein the accessing occurs by the debug host device pulling the data from the debug target device.

4. The machine implemented method as in claim 1, wherein accessing data in nonvolatile electrically erasable semiconductor memory on a debug target device comprises:
   accessing, via the hardware integrated debug framework, the input and output pins of the electrically erasable semiconductor memory;
   accessing, via the input and output pins of the electrically erasable semiconductor memory, one or more stored data blocks; and
   copying, through the external debug interface, one or more data blocks from the electrically erasable semiconductor memory to the debug host device.

5. The machine implemented method as in claim 4, wherein the input and output pins of the electrically erasable semiconductor memory device are accessed via a general-purpose input-output controller using the command protocol of the semiconductor memory device.

6. The machine implemented method as in claim 5, wherein the general-purpose input-output controller is commanded by a memory controller device programmed with the command protocol of the electrically erasable semiconductor memory.

7. The machine implemented method as in claim 6, wherein the memory controller device for the electrically erasable semiconductor memory is controlled by a direct memory access controller, wherein the direct memory access controller is controlled via the hardware integrated debug framework.

8. A machine implemented method at a debug host device, the method comprising:
   accessing, through an external debug interface on a debug target device, a hardware integrated debug framework of a system on a chip integrated circuit;
   copying, via the hardware integrated debug framework, a page table on one or more processors from the debug target device, to the debug host device, through the external debug interface;
   analyzing the page table entries copied from the debug target device to determine the subset of page mapped virtual addresses that contain kernel memory allocations;
   accessing, vie the debug framework, one or more physical memory addresses containing kernel memory allocations on the debug target device; and copying, through the debug interface, one or more blocks of memory stored at the one or more physical memory addresses on the debug target device.

9. The machine implemented method as in claim 8, wherein analyzing the page table entries to determine the subset of page mapped virtual addresses that contain kernel memory allocations comprises applying an algorithm to the set of page mapped virtual addresses to find a pattern of mappings that indicate one or more kernel memory allocations.

10. The machine implemented method as in claim 8, wherein analyzing the page table entries to determine the subset of page mapped virtual addresses that contain kernel memory allocations further comprises reading a bit in the page table entry data structure.

11. A non-transitory machine-readable storage medium having instructions stored therein, which when executed by a machine cause the machine to perform operations, the operations comprising:
    accessing data in the volatile random access system memory of a debug target device via a hardware integrated debug framework;
    accessing data on a nonvolatile random access electrically erasable semiconductor memory device of the debug target device via the hardware integrated debug framework using a device translation layer for the semiconductor memory device;
    accessing one or more registers of one or more processors on the debug target device; and
    creating a debug target system snapshot on a debug host device, the debug target system snapshot comprising at least the system memory data, the nonvolatile memory data, and the data from one or more registers of one or more processors on the debug target device, wherein the debug target device has malfunctioned due to a failure.

12. The machine-readable storage of claim 11, wherein accessing data in system memory of a debug target device comprises:
    accessing the hardware integrated debug framework through an external debug interface;
    copying, to the debug host device, one or more page tables from on one or more processors on the debug target device using the hardware integrated debug framework;
    accessing one or more physical memory addresses on the debug target device using virtual memory mappings listed in one or more page tables copied from one or more processors on the debug target device; and
    copying, to the debug host device, one or more blocks of memory stored at the one or more physical system memory addresses on the debug target device.

13. The machine-readable storage of claim 11, wherein accessing data in nonvolatile electrically erasable semiconductor memory on a debug target device comprises:
    accessing, via the hardware integrated debug framework, the input and output pins of the electrically erasable semiconductor memory;
    reading one or more data blocks from the electrically erasable semiconductor memory using a command protocol specific to the electrically erasable semiconductor memory device; and
    copying, through the debug interface, one or more blocks of data stored on the electrically erasable semiconductor memory of the debug target device, to the debug host device, using the command protocol of the electrically erasable semiconductor memory device.

14. The machine readable storage of claim 13, wherein the input and output pins of the nonvolatile electrically erasable semiconductor memory device are driven via a general purpose input-output controller, which is controlled via the hardware integrated debug framework.

15. The machine readable storage of claim 14, wherein the general purpose input-output controller is commanded by a memory controller device specific to the nonvolatile electrically erasable semiconductor memory, and wherein the memory controller device is controlled by a hardware debugger using the hardware integrated debug framework.

16. The machine readable storage of claim 15, wherein the memory controller device for the electrically erasable semiconductor memory is controlled by a direct memory access controller, wherein the direct memory access controller is controlled via the hardware integrated debug framework.

17. A non-transitory machine-readable storage medium having instructions stored therein, which when executed by a machine cause the machine to perform operations, the operations comprising:
    accessing, through an external debug interface, a hardware integrated debug framework;
    copying, via the hardware integrated debug framework, a page table on one or more processors from the debug target device to the debug host device, through the external debug interface;
    analyzing the page table entries copied from the debug target device to determine the subset of page mapped virtual addresses that contain kernel memory allocations by applying an algorithm to the set of page mapped virtual addresses, the algorithm comprising analyzing the set of page mapped virtual addresses to find a pattern of mappings, the pattern of mappings to indicate the presence of one or more kernel memory allocations;
    accessing, via the debug framework, one or more physical memory addresses containing kernel memory allocations on the debug target device; and
    copying, through the debug interface, one or more blocks of memory stored at the one or more physical memory addresses on the debug target device.

18. The machine readable storage of claim 17, wherein analyzing the page table entries to determine the subset of page mapped virtual addresses that contain kernel memory allocations further comprises reading a bit in the page table entry data structure.

19. A debugging system for embedded devices, the system comprising:
    a debug host device comprising one or more processors, a main system memory, and a nonvolatile storage device;
    a hardware debug device coupled with the debug host device, the hardware debug device to provide a debug interface between a debug host device and one or more debug target devices;
    a debug target device comprising a system on a chip integrated circuit, volatile DRAM memory, and nonvolatile electrically erasable semiconductor memory, wherein the system on a chip integrated circuit comprises one or more processors and a hardware integrated debug framework, the hardware integrated debug framework to allow the hardware debug device and debug host device to control the one or more processors of the system on a chip integrated circuit after the debug target device malfunctions due to an operating system level wherein the debug target device further comprises a semiconductor memory controller device controlled by a direct memory access controller, the direct memory access controller controlled by the debug host device via the hardware integrated debug framework, and a software simulation of one or more hardware components on the debug target device substitutes for one or more components of the debug target device; and
    a debug console, attached to the debug host device, to monitor debug output from the debug target device.

20. The system as in claim 19, wherein the debug target device further comprises a general purpose input-output controller, to control the input and output pins of the nonvolatile electrically erasable semiconductor memory device.

21. The system as in claim 20, wherein the debug host device is coupled to the debug target device through at least one network.

22. The system as in claim 20, wherein the general-purpose input-output controller is controlled by the semiconductor memory controller device via the hardware integrated debug framework.

23. The system as in claim 22, wherein the debug host device uses a device driver stored in system memory to control hardware on the debug target device via the hardware integrated debug framework.

24. The system as in claim 22, wherein external hardware that duplicates the functionality of one or more internal hardware components of the debug target device substitutes for one or more components of the debug target device.

25. The system as in claim 22, wherein a software component executing on the debug host device that duplicate the functionality of one or more software components of the debug target device substitutes for one or more components of the debug target device.

26. The system as in claim 22, wherein file system information of the debug target device is extracted to reconstruct the file system on the debug host device.

* * * * *